May 23, 1944. W. A. CONWAY, JR 2,349,340
PICTURE MOUNT
Filed Jan. 8, 1941
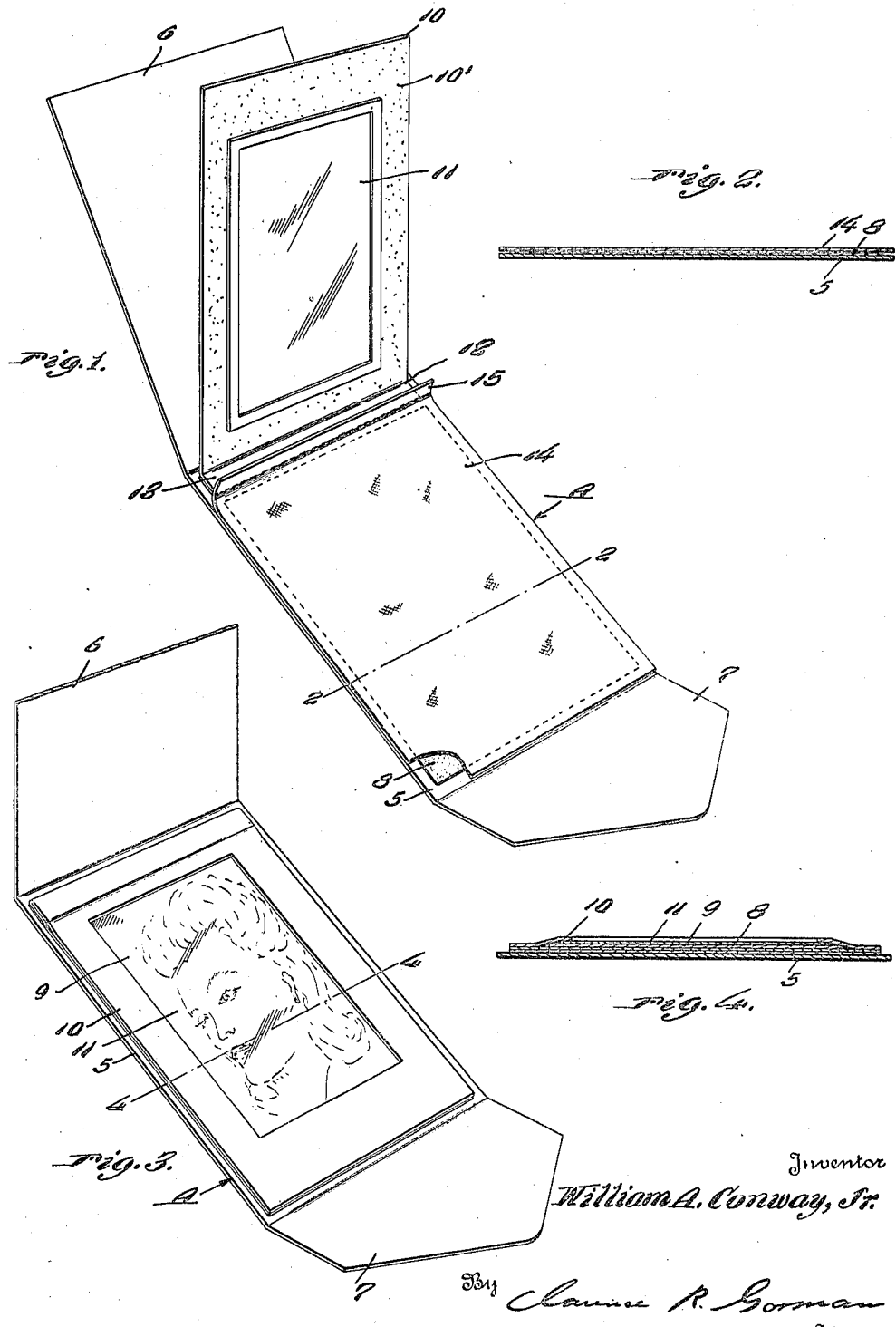
Inventor
William A. Conway, Jr.
By Clarence R. Gorman
Attorney Patented May 23, 1944

2,349,340

UNITED STATES PATENT OFFICE 2,349,340

PICTURE MOUNT

William A. Conway, Jr., Shamokin, Pa.

Application January 8, 1941, Serial No. 373,661

3 Claims. (Cl. 40—158)

This invention has reference to new and useful improvements in mounts for pictures such as photographs, cards and the like.

An important object of the invention is to provide a mount which will enable amateur and professional photographers alike to accurately and rapidly center the picture thereon.

A further object of the invention is to provide a mount which will preserve the picture by protecting it from the air and dust, and which will retain the picture in place thereon without the liability of the wrinkling of the picture.

A still further object is to provide a mount which will be attractive in appearance, simple in construction, practicable and reliable in use, and inexpensive to manufacture.

Other objects will be apparent from the following detailed description, taken in connection with the accompanying drawing, wherein Figure 1 is a perspective view of the improved mount prior to the positioning of the picture thereon;

Figure 2 is a sectional view of the mount, taken on line 2—2 of Figure 1;

Figure 3 is a perspective view of the mount with the picture positioned thereon; and, Figure 4 is a sectional view taken on line 4—4 of Figure 3.

In the drawing, wherein for the purpose of illustration, is shown a preferred embodiment of my invention, the letter A denotes generally the improved mount, which may be made of cardboard or similar material. This mount has an intermediate or back portion 5 and flaps 6 and 7. Permanently attached to the inner surface of this intermediate or back portion is a sheet of relatively thin material 8, which has its entire exposed surface provided with either a heat-sealing or a pressure-sensitive adhesive, the latter being preferable, to form a contact surface to which the rear of the picture 9 is adhesively secured. The picture is of smaller dimensions than the sheet 8, thus providing the sheet with marginal exposed adhesive-covered edges. This adhesive covered sheet is slightly less in length and width than the intermediate or back portion 5, thereby leaving the marginal edges of the intermediate portion free of adhesive, as clearly shown in Figure 1.

A frame or mat 10, which is of the same dimensions as the sheet 8, has therein a transparent window 11 through which the picture 9 is exposed to view. One end of this frame is scored as at 12 to form a folded strip 13, which is securely applied to the upper end of the adhesive-covered sheet to pivotally affix the frame to the intermediate or back portion 5 of the mount and in alignment with the sheet. The outer portions 10' of the inner side of the frame are coated with adhesive so that when the face of the picture 9, which is of smaller dimensions than the frame, has been centered thereon by securing the edges of the picture to said frame, the frame, carrying the picture and having its marginal edges free, is pivotally moved toward the sheet 8 to adhesively secure the marginal edges of the frame and the rear of the picture to said sheet, and thus to the back of the mount. There is thus eliminated the tedious task of centering the picture and of aligning the frame relative to the mount in order to have the picture and the frame in their respective proper positions. The picture having been centered on the frame and secured thereto, the frame automatically falls in an aligned position with the sheet 8, as clearly shown in Figure 3, and the frame with the sheet, seals the picture 9 against dirt, dust, air and markings.

In order to protect the adhesive-covered sheet and to prevent it from adhering to the frame 10 prior to the mounting of the picture, a cover 14 of Holland cloth or similar material, is placed over the sheet. This protective cover extends over the marginal edges of the intermediate or back portion 5 of the mount and over the folded strip 13 to provide the cover with a free end 15, which can be grasped for the purpose of removing the cover when the picture is to be mounted.

In use, the cover 14 is first removed by pulling the free end 15 thereof, and the picture 9 or the like, which is to be mounted, and which is of smaller dimensions than the frame 10 and the adhesive covered surface of the sheet 8, is centered on the frame and secured thereto, leaving the marginal edges of the frame free. The frame or mat 10, which is of the same dimensions as the sheet 8, and which is pivotally attached thereto and in alignment therewith, is then swung downward into its position covering the sheet. The frame and the intermediate or back portion 5 of the mount are pressed together, thereby fastening the rear of the picture 9 to the sheet 8, and the marginal edges of the frame to the marginal edges of the sheet, to seal the picture in place and to protect it against the entrance of dirt, dust and air.

While I have illustrated and described a particular embodiment of my improved mount, it has merely been to present a preferred form of my invention, and I do not wish to be limited to that particular embodiment, since it is obvious that numerous changes may be made in the details of construction without departing from the spirit of the invention or exceeding the scope of the appended claims.

What I claim is:

1. A picture mount of the class described, comprising a back, an adhesive-covered sheet secured to and of less dimensions than the back for adhesively receiving the rear of the picture, and a frame having a scored end edge adhesively united with one end of the sheet, whereby the frame is adapted to be swingably moved into position over the picture and secured to the sheet beyond the boundaries of the picture to seal the picture between the frame and sheet.

2. A picture mount comprising a back with an integral flap, a sheet one face of which is secured to said back, the opposite face being adhesive, a protective cover mounted on the adhesive face of the sheet to prevent contact of the flap with said adhesive face, the cover being removable from the sheet preparatory to engagement of a picture therewith, and a picture impinging frame one end of which is hingedly secured to the adhesive face of the sheet, the picture impinging side of the frame being also engaged to the adhesive face of the sheet around the margins of the picture.

3. A picture mount comprising a base, a sheet secured to said base, the exposed side of which is adhesive, a protective cover mounted on and completely covering the adhesive face of the sheet to prevent contact with said adhesive, the cover being removable, preparatory to engagement of a picture therewith, and a picture clamping frame hingedly secured to said sheet beyond one margin of the picture, said frame being engageable over the marginal edges of the picture and secured to the adhesive face of the sheet beyond said marginal edges to form a seal.

WILLIAM A. CONWAY, Jr.